US008751436B2

(12) United States Patent
Lowry et al.

(10) Patent No.: US 8,751,436 B2
(45) Date of Patent: Jun. 10, 2014

(54) ANALYZING DATA QUALITY

(75) Inventors: Thomas Britton Lowry, Matthews, NC (US); Om Purushotham Akarapu, Hyderabad (IN); Srihari Rao Gatpa, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 300 days.

(21) Appl. No.: 13/050,049

(22) Filed: Mar. 17, 2011

(65) Prior Publication Data
US 2012/0123994 A1 May 17, 2012

Related U.S. Application Data

(60) Provisional application No. 61/414,808, filed on Nov. 17, 2010.

(51) Int. Cl.
*G06F 9/44* (2006.01)
(52) U.S. Cl.
USPC .............................................................. 706/52
(58) Field of Classification Search
None
See application file for complete search history.

(56) References Cited

U.S. PATENT DOCUMENTS

| | | | | |
|---|---|---|---|---|
| 5,461,699 A | * | 10/1995 | Arbabi et al. ................... | 706/21 |
| 6,597,777 B1 | * | 7/2003 | Ho ................................. | 379/133 |
| 6,731,990 B1 | * | 5/2004 | Carter et al. ..................... | 700/52 |
| 7,251,578 B1 | | 7/2007 | Chen et al. | |
| 7,505,868 B1 | * | 3/2009 | Shan .............................. | 702/182 |
| 2004/0128184 A1 | * | 7/2004 | Bracken et al. ................. | 705/10 |
| 2006/0251176 A1 | | 11/2006 | Hatabu et al. | |
| 2008/0162487 A1 | * | 7/2008 | Richter ........................... | 707/10 |
| 2008/0195440 A1 | | 8/2008 | Bagchi et al. | |
| 2010/0306095 A1 | * | 12/2010 | Olson et al. ..................... | 705/35 |
| 2011/0085469 A1 | * | 4/2011 | Klincewicz et al. ........... | 370/254 |

FOREIGN PATENT DOCUMENTS

WO 2005-064491 A1 7/2005

OTHER PUBLICATIONS

Nousiainen et al., "Anomaly Detection from Server Log Data—A Case Study", Apr. 2009, pp. 1-46.*
Shanbhag et al., "A Benchmark for Volume-Based Internet Anomaly Detection", 2009, IEEE, pp. 1-6.*

* cited by examiner

*Primary Examiner* — Jeffrey A Gaffin
*Assistant Examiner* — Paulinho E Smith
(74) *Attorney, Agent, or Firm* — Banner & Witcoff, Ltd.; Michael A. Springs

(57) ABSTRACT

Methods, computer readable media, and apparatuses for analyzing data quality are presented. Transaction information may be received from a database, and the transaction information may describe various aspects of a plurality of transactions handled by an organization. Subsequently, a forecast may be calculated based on the transaction information, and the forecast may predict the future value of a metric. An upper control limit and a lower control limit for the metric may be determined based on the transaction information. Thereafter, the latest actual value of the metric may be computed. A normalized quality score for the metric then may be calculated based on the latest actual value of the metric, the forecast, the upper control limit, and the lower control limit. Optionally, a chart may be generated to evaluate data quality for a plurality of metrics, and metrics that exceed a control limit may be added to an issue log.

18 Claims, 9 Drawing Sheets

| Metric History Table 700 |||||||
|---|---|---|---|---|---|---|
| Metric | Actual | Forecast | LCL | UCL | Quality Score | As Of |
| Metric 123 | 5.0 | 5.0 | 4.0 | 6.0 | 0 | Oct '09 |
| Metric 124 | 2.3 | 2.0 | 1.0 | 3.0 | 0.3 | Sep '09 |
| Metric 125 | 61% | 60% | 58% | 62% | 0.5 | Jul '09 |
| Metric 126 | 21.5% | 22% | 20% | 23% | -0.25 | Oct '09 |

| 600 |
|---|
| Metric Definition Table: Metric 123 |
| Description: Metric 123 measures the quantity of transactions within the financial institution during the previous month that were credit card sales. — 601 |
| Latest Actual Value<br>Calculation Method: =GetCreditCardQuantity(parameter)<br>Parameters: Master_Transaction_DB.Total_Sales(previous_month) — 602 |
| Forecast<br>Forecast Method: Forecast Method 1<br>Parameters: Actual Data from Previous 24 Months — 603 |
| Lower Control Limit<br>Calculation Method: LCL Method 3<br>Parameters: Actual Data from Previous 18 Months — 604 |
| Upper Control Limit<br>Calculation Method: UCL Method 1<br>Parameters: Actual Data from Previous 12 Months — 605 |

| Metric History Table | | | | | | |
|---|---|---|---|---|---|---|
| Metric | Actual | Forecast | LCL | UCL | Quality Score | As Of |
| Metric 123 | 5.0 | 5.0 | 4.0 | 6.0 | 0 | Oct '09 |
| Metric 124 | 2.3 | 2.0 | 1.0 | 3.0 | 0.3 | Sep '09 |
| Metric 125 | 61% | 60% | 58% | 62% | 0.5 | Jul '09 |
| Metric 126 | 21.5% | 22% | 20% | 23% | -0.25 | Oct '09 |

FIG. 7

| Forecast Definition Table: Forecast Method 1 | |
|---|---|
| Description: Forecast Method 1 calculates a forecast for the next value in a series by computing the simple moving average of the specified number of previous values in the series. | 801 |
| Formula<br>Forecast = sum(values)/quantity(values) | 802 |
| Parameters<br>1: Data Source<br>2: Number of Previous Values to Consider | 803 |
| Source Code<br>M:\comp\forecast_methods\forecast_method_1 | 804 |

| Lower Control Limit Definition Table: LCL Method 1 | |
|---|---|
| Description: LCL Method 1 calculates a lower control limit for the next value in a series by subtracting the maximum variance in the previous six samples from the forecast. | 901 |
| Formula<br>LCL = Forecast - Max_Variance(values) | 902 |
| Parameters<br>1: Data Source<br>2: Forecast | 903 |
| Source Code<br>M:\comp\LCL_methods\LCL_method_1 | 904 |

Upper Control Limit Definition Table: UCL Method 1 — 1000

Description: UCL Method 1 calculates an upper control limit for the next value in a series by adding the maximum variance in the previous six samples to the forecast. — 1001

Formula
UCL = Forecast + Max_Variance(values) — 1002

Parameters
1: Data Source
2: Forecast — 1003

Source Code
M:\comp\UCL_methods\UCL_method_1 — 1004

FIG. 10

Latest Actual Value Definition Table: Metric 123 — 1100

Description: Metric 123 measures the quantity of transactions within the financial institution during the previous month that were credit card sales. — 1101

Formula
Latest Actual Value = Total Sales - Non-Credit Card Sales — 1102

Parameters
1: Data Source — 1103

Source Code
M:\comp\LAV_methods\LAV_metric_123 — 1104

FIG. 11

ANALYZING DATA QUALITY

CROSS-REFERENCE TO RELATED APPLICATIONS

This application claims the benefit of U.S. Provisional Patent Application Ser. No. 61/414,808, which was filed Nov. 17, 2010, and entitled "Analyzing Data Quality," and which is incorporated by reference herein in its entirety.

BACKGROUND

As computing technology continues to advance, businesses are increasingly able to collect an ever expanding amount of data about their customers, competitors, employees, and other entities. In addition, once this data has been gathered, a business may wish to leverage such data to inform all sorts of decisions, from marketing new products and services to improving internal processes and rewarding outstanding employees. As businesses increasingly rely on data in making decisions, the desirability of evaluating, enhancing, and ensuring the quality of such data is also increased.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to analyzing data quality. In one or more arrangements, the term "data quality" may describe a measure of confidence that an organization or entity, such as a financial institution, may have in particular information. The information may include, for instance, raw data gathered from various sources (e.g., raw transaction history data that represents various aspects of one or more transactions involving and/or processed by a financial institution) and/or processed data that has been previously analyzed (e.g., the results of one or more metrics and/or other analytical functions computed or otherwise determined based on raw data, such as raw transaction history data). Stated differently, the information being analyzed may include, for instance, raw data gathered from any source internal or external to an organization seeking to measure data quality, as well as data derived from other information and/or the raw data. While one or more of the examples described herein discuss analyzing data quality of transaction information at a financial institution, any desirable type of data may be analyzed in accordance with one or more aspects of the disclosure.

For example, an organization, such as a financial institution, may analyze a set of transaction data on a monthly basis using one or more metrics. The metrics may be computational functions that use the transaction data and/or other information as inputs in computing some result. In many instances, the result, which may represent the value of the metric, may be useful to the organization, as it may provide all sorts of insight into various aspects of the organization's business. For instance, the financial institution in the previous example may use one or more metrics to determine how many credit card transactions it is processing for a particular retailer, and the financial institution may use this information to make better business decisions with respect to managing its relationship with the retailer.

In many cases, however, an organization, such as a financial institution, may have a myriad of different metrics that rely on different data for inputs and compute a variety of different outputs. In addition, among this myriad of metrics, particular issues that affect data quality for certain metrics may be difficult to discover and resolve. For example, a financial institution may rely on one metric to measure the quantity of credit card transactions at a particular retailer and to predict what that quantity will be in the coming month or months. If, however, the metric behaves unpredictably (e.g., if, in this example, the measured value of credit card transactions differs greatly from a previously calculated forecast), then the financial institution might not be able to have confidence in and/or rely on the metric in making various business decisions (e.g., in creating incentives and/or providing offers to the particular retailer being evaluated by the metric in this example). Moreover, similar data quality issues may exist with respect to still other metrics among the myriad used by the financial institution. Thus, to effectively manage all of these metrics, an organization may wish to identify data quality issues and determine which metrics are performing as expected and which metrics require improvement. By implementing one or more aspects of the disclosure, an organization may be able to do so.

According to one or more aspects, transaction information may be received from a database, and the transaction information may include and/or describe one or more trends (e.g., one or more series of values corresponding to information received and/or analyzed over time). Subsequently, a forecast may be calculated based on the transaction information (e.g., the previous values in the one or more trends), and the forecast may predict the future value of a metric. An upper control limit and a lower control limit for the metric may be determined based on the transaction information. Thereafter, the latest actual value of the metric may be computed. Once the latest actual value of the metric has been computed and/or is otherwise available, a normalized quality score for the metric then may be calculated based on the latest actual value of the metric, the forecast, the upper control limit, and the lower control limit. In one or more arrangements, the normalized quality score for the metric may represent how well the latest actual value reflects previous expectations for the metric in view of the forecast and/or the control limits.

According to one or more additional aspects, a chart that includes the normalized quality score for the metric and at least one other normalized quality score for at least one other metric may be generated. Using such a chart, an organization, such as a financial institution, may be able to comparatively evaluate the quality of data used in computing different metrics. This approach may be advantageous to an organization, because if the organization is measuring thousands of dissimilar metrics, an analyst at the organization may be able to quickly glance at the chart, rapidly identify one or more metrics that may require further investigation, and/or easily obtain more detailed information about the behavior of (or any other aspects of) any particular metric included in the chart. Additionally or alternatively, in a situation where it is determined that the actual value of the metric has exceeded the upper control limit or the lower control limit, the metric may be added to an issue log for remediation. This practice may enable an organization, such as a financial institution, to improve its data gathering and analysis activities and stay abreast of unusual changes in data that may be indicative of other issues requiring additional attention.

By implementing one or more aspects of the disclosure, an organization, such as a financial institution, may be able to add to, remove from, or change many metrics simultaneously with respect to which the organization may be monitoring data quality. For instance, by storing one or more parameters for calculating forecasts and control limits in data tables, an organization, such as a financial institution, may be able to use standard structured query language (SQL) to simultaneously change how such forecasts and/or control limits are calculated with respect to thousands of metrics simply by executing a single line of code. Additionally or alternatively, aspects of the disclosure may enable such an organization to locate the few metrics, among the many, that require immediate further scrutiny. Thus, a system implementing one or more aspects of the disclosure may enable a user to query the quality of data and may accordingly be known as a "DaQQUERY" system.

BRIEF DESCRIPTION OF THE DRAWINGS

The present disclosure is illustrated by way of example and not limited in the accompanying figures in which like reference numerals indicate similar elements and in which:

FIG. 6 illustrates a metric definition table according to one or more illustrative aspects described herein.

FIG. 7 illustrates a metric history table according to one or more illustrative aspects described herein.

FIG. 8 illustrates a forecast definition table according to one or more illustrative aspects described herein.

FIG. 9 illustrates a lower control limit definition table according to one or more illustrative aspects described herein.

FIG. 10 illustrates an upper control limit definition table according to one or more illustrative aspects described herein.

FIG. 11 illustrates a latest actual value definition table according to one or more illustrative aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

I. Illustrative Embodiments

Figure 1A:
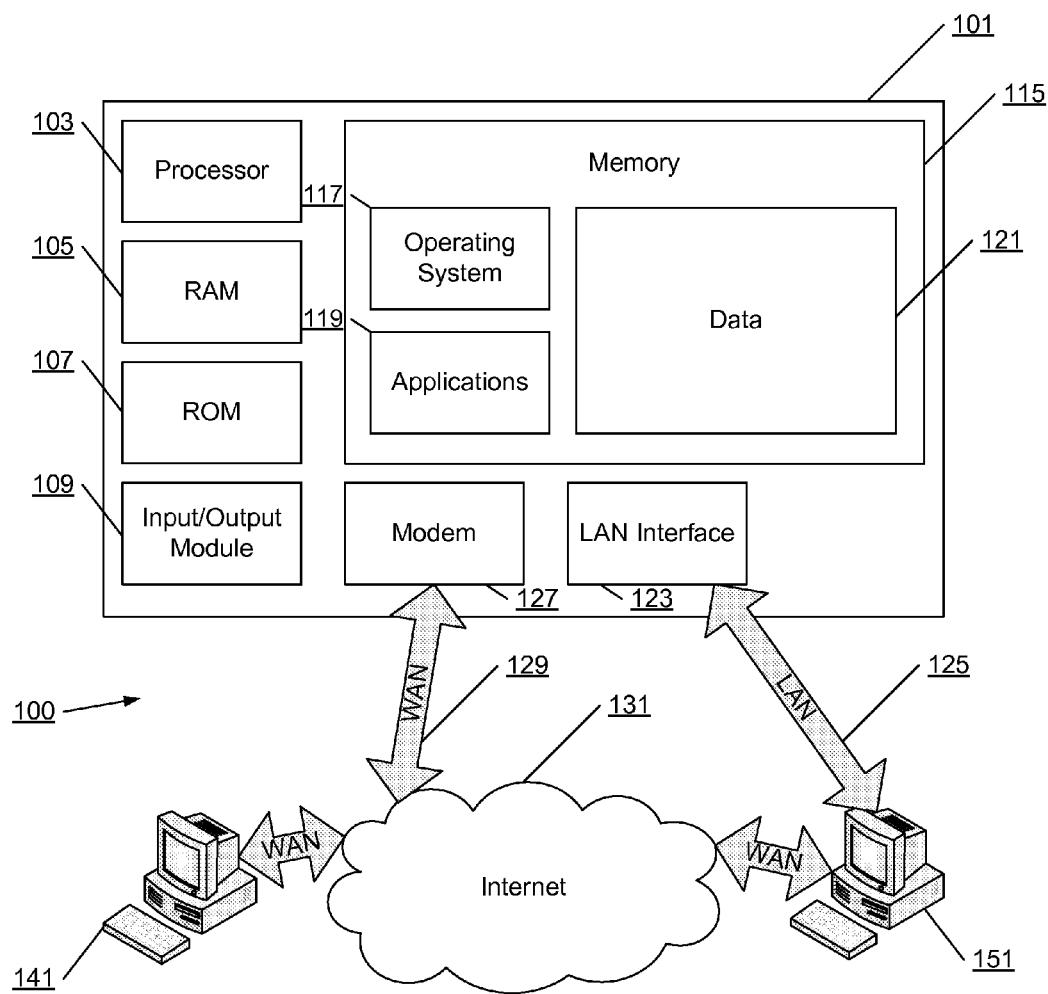
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
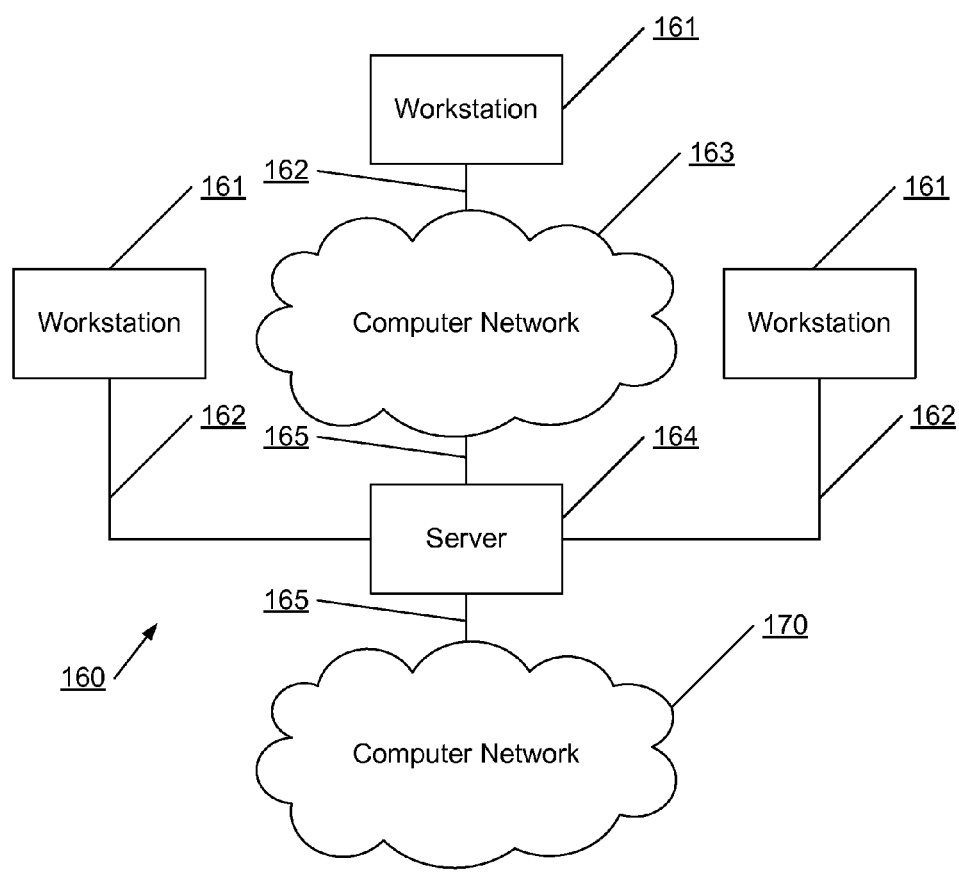
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/ or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and the like.

Figure 2:
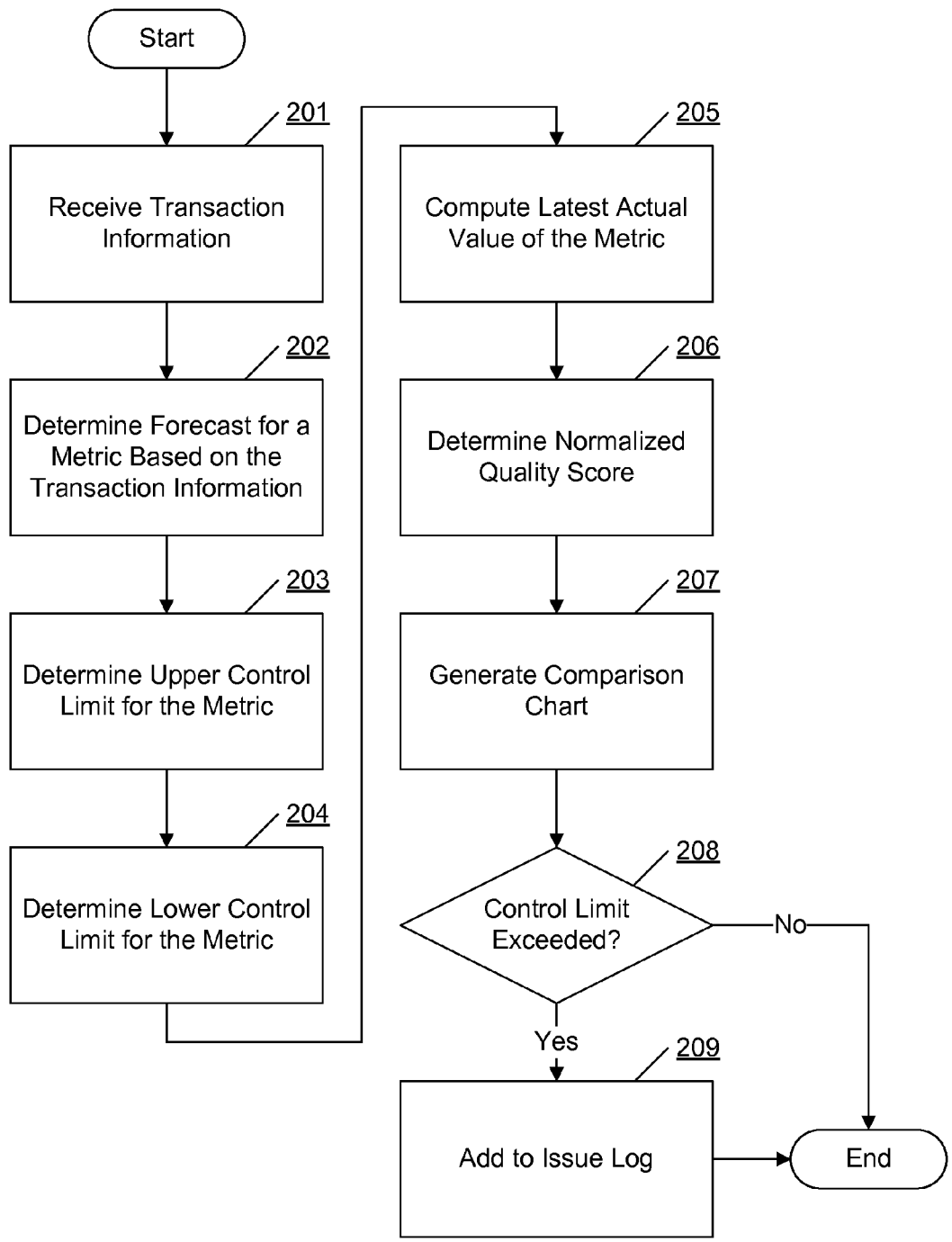
FIG. 2 illustrates a method of determining a normalized quality score for a metric according to one or more illustrative aspects described herein.

FIG. 2 illustrates an example method of determining a normalized quality score for a metric according to one or more aspects described herein. According to one or more aspects, the methods described herein may be implemented by software executed on one or more computers, such as the generic computing device 101 of FIG. 1A, and/or by a computing system, such as system 160 of FIG. 1B. In at least one arrangement, the methods described herein may be performed by and/or in combination with a server (e.g., server 164). Additionally or alternatively, the methods described herein may be performed by and/or in combination with one or more workstations (e.g., workstations 161).

In step 201, transaction information may be received. In one or more arrangements, the transaction information may be received from a database associated with a financial institution and may include a variety of information about various transactions that were handled and/or facilitated by the financial institution. For example, the transaction information may include information about credit card transactions, debit card transactions, check transactions, teller transactions, and/or other types of transactions processed by the financial institution. In addition, the transaction information may include information that identifies one or more of the parties to each transaction (e.g., by name, by unique customer identifier, and the like) included in the information, such as the names of customers of the financial institution involved in each transaction. The transaction information also may include date information, which may indicate, for each transaction included in the information, the date and/or time that the transaction occurred.

In one or more arrangements, the transaction information further may include household information for each transaction. The household information may, for instance, include information that identifies one or more households to which one or more of the parties of a particular transaction belong (e.g., by last name, by unique household identifier, and the like). Such household information may be determined, for instance, by the financial institution based on other information managed by the financial institution (e.g., customer records). Additionally or alternatively, the financial institution may regularly sort customers into households, and when a particular customer is involved in a transaction, the customer's predetermined household identifier may be added to the database in which the transaction information is stored, along with the other information about the transaction.

In one or more arrangements, the transaction information also may include other fields.

For example, the transaction information may include an "aggregate business name," which, for transactions between an individual and a corporate entity (or other business), may represent the name of the corporate entity (or other business). In application, the aggregate business name field thus may include the names of retailers, grocery stores, gas stations, utility companies, service providers, and/or other businesses. For any particular transaction of this type, the financial institution may, for instance, use fuzzy logic and/or other methods to parse information it receives in processing transactions to determine the name of the business involved in the transaction and store such information in the database in which the transaction information is stored.

Additional types of information that may be included in the transaction information include channel and category information. For example, for each transaction, the transaction information may indicate the channel in which the particular transaction occurred (e.g., credit card transaction, debit card transaction, check transaction, teller transaction, and the like). In addition, for each transaction, the transaction information may include one or more categories that correspond to the nature of the transaction. For instance, a transaction may be categorized as an education expense, a payroll deposit, a grocery expense, a restaurant expense, and/or as any other desired type of transaction. Similar to how the financial institution determined one or more aggregate business names for each transaction, the financial institution also may determine one or more categories for each transaction, and in at least some instances, the one or more categories determined to apply to a particular transaction may be linked to the aggregate business name determined to be applicable to the transaction (e.g., because if a customer of the financial institution was involved in a credit card transaction at a business that is known to be a restaurant, the financial institution may categorize the transaction as a restaurant or food expenditure).

As further explained below, once an entity, such as a financial institution, collects such transaction information, the entity may create one or more metrics that measure various aspects of the transaction information. For instance, a financial institution might create a metric that measures the total quantity of credit card transactions originating from a particular retailer, such as a department store, on a monthly basis. Each month, the financial institution may determine the actual value of the metric, which in this example would be the total quantity of credit card transactions originating from the department store, and subsequently may use the information in making a variety of business decisions. For example, with knowledge of this measured quantity of credit card transactions, the financial institution might offer special processing discounts to the department store to develop the relationship between the financial institution and the department store, charge additional processing fees to the department store where contractual requirements are not met or where it is otherwise desirable to do so, and/or engage in all sorts of other activities. In view of the various ways in which the financial institution may use this transaction information, it may be desirable for the financial institution to evaluate, enhance, and/or ensure the quality of this information (e.g., by measuring the accuracy of the data). By performing one or more steps of the methods described herein, a qualitative and/or quantitative measure of the quality of this data may be computed for any particular metric (and/or a plurality of metrics). Indeed, as further discussed below, determining the degree to which the actual value of a metric varies from a forecasted value of the metric may be one way of evaluating data quality.

Thus, in step 202, a forecast for a metric may be determined based on the transaction information, and the forecast may predict the future value of a metric. For example, any desired mathematical function may be selected as a forecast method. Additionally or alternatively, a function may be selected as a forecast method, for instance, based on the degree to which the function matches the trend of the metric over a particular period of time, where the trend may be indicated in and/or defined by the transaction information. Subsequently, the forecast method may be used to calculate a forecast to predict the future value of the metric, and one or more previous values for the metric (e.g., as indicated in and/or defined by the transaction information) may be a parameter to the function selected to be the forecast method. In this way, a specific (and perhaps even unique) modeling function may be used to compute a forecast for any particular metric, thus enhancing the flexibility and versatility of one or more of the methods of analyzing data quality described herein.

For instance, depending on the shape of a trend curve for a particular metric, an analyst employed by the financial institution may select a particular modeling function to be used as the forecast method for the particular metric. In some instances, the forecast method may be a function as simple as a constant number (e.g., the value of the metric from the previous month) or a basic mathematical operation (e.g., a rolling average of the data from the previous six months). In other instances, the analyst may select and/or design a more complicated function to model the behavior of the trend curve (e.g., a polynomial function). Once the analyst has selected the forecast method to be used for the particular function, a computing system implementing one or more aspects of the disclosure may store information about the forecast method in one or more data tables, such as the example tables illustrated in FIG. 6 (e.g., in which the particular forecast method to be used for a given metric may be indicated) and FIG. 8 (e.g., in which the forecast method itself may be defined), both of which are further described below.

Thus, in one or more arrangements, in determining the forecast for the metric in step 202 of the method of FIG. 2, the computing system may access and load the information about the forecast method stored in one or more of these data tables (e.g., to determine which forecast method should be used for determining a forecast for the metric, and to determine how the particular forecast method is defined). Subsequently, the computing system may compute the forecast according to the definition of the forecast method (e.g., by calculating the result of the function in view of its particular parameter(s)). If, for instance, the computing device is determining a forecast for the metric measuring the quantity of monthly credit card transactions at a particular department store (as in the example above), the computing device may access a first data table in which the metric itself is defined and in which the particular forecast method for the metric is specified, and subsequently, the computing device may access a second data table in which the particular forecast method itself is defined. Then, in this example, the computing device may determine the forecast for the metric by calculating the result of the function in the forecast method definition (in view of the parameters required by the forecast method function). If, for example, the forecast method defines the forecast to be the rolling average of the actual values from the previous six months, then the computing system may calculate this average based on the historical transaction data from the previous six months, and return the result as the forecast (e.g., if the rolling average of the actual values from the past six months is 9.3 million transactions per month, then the computing system may determine the forecast for the coming month to be 9.3 million transactions).

According to one or more aspects, once a forecast has been calculated for a metric, it may be desirable to determine and/or set control limits around that forecast, so as to define some measures against which the accuracy of the forecast may be evaluated (once the actual latest value of the metric is eventually determined). In one or more arrangements, the control limits thus may define a range within which variance from the forecast may be deemed acceptable. Notably, different metrics may have different control limits, as further discussed below. For example, for some metrics, a variation of plus or minus ten percent from the forecast may be within acceptable control limits. On the other hand, for other metrics, a variation of plus or minus even half a percent from the forecast may exceed the acceptable control limits. The ways in which these control limits may be determined will now be described.

In step 203, an upper control limit may be determined for the metric. Similar to how a forecast for a metric could be determined, as described above, any desired mathematical function may be selected to be a method of calculating the upper control limit for any given metric. In addition, such a function may be computed based on various parameters, which may include the transaction information, the determined value of the forecast for the metric, and/or other information (e.g., the number of samples to take into account in calculating the upper control limit, and the like). Thus, as with the forecast method, a specific (and perhaps unique) modeling function may be used to compute an upper control limit for a particular metric, thus enhancing the flexibility and versatility of these analytical methods.

In practice, for instance, depending on the shape of a trend curve for a particular metric, an analyst employed by the financial institution may select a particular modeling function to be used in calculating the upper control limit for a particular metric, similar to how a modeling function may be selected for calculating a forecast. Like the modeling functions for calculating a forecast, the modeling function for calculating the upper control limit may be any type of function (e.g., a constant number, a linear function, a rolling average, a polynomial function, a more complicated and/or unique function designed by the analyst for the specific calculation, and the like). In addition, information about the function to be used in calculating the upper control limit may be stored in one or more data tables, such as the example tables illustrated in FIG. 6 (e.g., in which the particular function to be used in calculating the upper control limit for a given metric may be indicated) and FIG. 10 (e.g., in which the forecast method itself may be defined), both of which are further described below.

Thus, in one or more arrangements, in determining the upper control limit for the metric in step 203 of the method of FIG. 2, the computing system may access and load information stored in one or more data tables (e.g., to determine which function is to be used in calculating the upper control limit, and to determine how that particular function is defined). Subsequently, the computing system may compute the upper control limit using the specified function (e.g., by calculating the result of the function in view of its particular parameter(s)). If, for instance, the computing device is determining an upper control limit for the metric measuring the quantity of monthly credit card transactions at a particular department store (as in the example above), the computing device may access a first data table in which the metric itself is defined and in which the particular function to be used in calculating the upper control limit for the metric is specified, and subsequently, the computing device may access a second data table in which the function for calculating the upper control limit itself is defined. Then, in this example, the computing device may determine the upper control limit for the metric by calculating the result of the function in the upper control limit function definition (in view of the parameters required by the particular function). If, for example, the selected function defines the upper control limit to be ten percent more than the determined forecast, then the computing system may calculate this amount and return the result as the upper control limit (e.g., if the forecast for the coming month was determined to be 9.3 million transactions, the computing system may determine the upper control limit to be 10.23 million transactions).

In step 204, a lower control limit may be determined for the metric. In one or more arrangements, determining a lower control limit for a metric may be similar to determining an upper control limit for a metric, except that a different modeling function may be selected and used in calculating the lower control limit and/or different data tables (e.g., data tables describing the function to be used in calculating the lower control limit) may be consulted accordingly by the computing system.

For example, in determining a lower control limit for a metric, the computing system may access and load information stored in one or more data tables (e.g., to determine which function is to be used in calculating the lower control limit, and to determine how that particular function is defined). Subsequently, the computing system may compute the lower control limit using the specified function (e.g., by calculating the result of the function in view of its particular parameter(s)). If, for instance, the computing device is determining a lower control limit for the metric measuring the quantity of monthly credit card transactions at a particular department store (as in the example above), the computing device may access a first data table in which the metric itself is defined and in which the particular function to be used in calculating the lower control limit is specified, and subsequently, the computing device may access a second data table in which the function for calculating the lower control limit itself is defined. Then, in this example, the computing device may determine the lower control limit for the metric by calculating the result of the function in the lower control limit function definition (in view of the parameters required by the particular function). If, for example, the selected function defines the lower control limit to be ten percent lower than the determined forecast, then the computing system may calculate this amount and return the result as the lower control limit (e.g., if the forecast for the coming month was determined to be 9.3 million transactions, the computing system may determine the lower control limit to be 8.37 million transactions).

According to one or more aspects, once a forecast and control limits for a metric have been calculated, a computing system implementing one or more aspects of the disclosure (e.g., a computing system operated by a financial institution) may then wait for the actual data to be processed and measured. For example, if the metric being evaluated measures the quantity of monthly credit card transactions at a particular department store (as in the example above), and if the forecast predicts the value of this metric for the current month (which, in this example, might not have yet concluded), the system may wait for the current month to conclude so that the actual data from this month may be processed and measured. Subsequently, the system may analyze the actual data for the current month (or other desired time period to be evaluated, such as the current day, current year, and the like) to estimate the quality of the actual data. As further described below, this may involve determining the latest actual value for the metric and subsequently calculating a normalized quality score for the metric. The ways in which this evaluation and estimation may be performed will now be described.

In step 205, the latest actual value of the metric may be computed. According to one or more aspects, the way in which the latest actual value of the metric is computed may be specified by one or more formulas and/or other functions (e.g., software code stored and/or referenced in one or more data tables). Thus, in determining the latest actual value of the metric, for example, a computing device implementing one or more aspects of the disclosure may access and load information stored in one or more data tables (e.g., to determine how the latest actual value is to be calculated). Subsequently, the computing system may compute the latest actual value of the metric using the specified formulas and/or functions (e.g., by calculating the result of the formulas and/or functions, by otherwise performing the methods specified in the data tables, and the like).

For example, if the computing device is determining the latest actual value for the metric measuring the quantity of monthly credit card transactions at a particular department store (as in the example above), the computing device may access a first data table in which the metric itself is generally defined (e.g., the example table illustrated in FIG. 6), and subsequently, the computing device may access a second data table in which the particular formulas and/or functions to be used in computing the latest actual value for the metric are defined (e.g., the example table illustrated in FIG. 11). Then, in this example, the computing device may determine the latest actual value for the metric by calculating the result of the specified formulas and/or functions (or otherwise performing the specified method or methods, which may include accessing and processing transaction information, such as the transaction information received in step 201 or transaction information similar thereto, but also including information about transactions from the current month). Thus, in this example, the computing device may process the transaction information from the latest month (e.g., by counting credit card transactions included in the data for which the counterparty or aggregate business name of the transaction matches the name of the department store) and return the result as the latest actual value of the metric (e.g., the computing device may determine that there were 9.765 million credit card transactions at the department store during the latest month).

Subsequently, in step 206, a normalized quality score may be calculated for the metric. In one or more arrangements, this calculation may be based on the latest actual value of the metric, the forecast, the upper control limit, and/or the lower control limit. By computing such a normalized quality score for the metric, an organization, such as a financial institution, may be able to compare the data quality for the particular metric with the data quality of other metrics, which may enable the organization to target certain metrics for improvement (e.g., the organization may wish to select certain metrics for which it may be desirable to improve data collection, forecasting, analysis, and the like).

According to one or more aspects, calculating a normalized quality score for the metric may include comparing the latest actual value of the metric with the forecast, the upper control limit, and/or the lower control limit to evaluate how closely the latest actual value matched the forecast and/or to determine whether and to what extent the latest actual value approached or exceeded the upper or lower control limit. Additionally or alternatively, the quality score may be normalized by placing it on a scale from negative one to positive one, where a score of negative one represents a situation in which the latest actual value was determined to be the lower control limit, a score of zero represents a situation in which the latest actual value was determined to be the forecast, and a score of positive one represents a situation in which the latest actual value was determined to be the upper control limit. On this scale, a score lower than negative one or a score higher than positive one is representative of a situation in which one of the control limits was exceeded. In addition, when the latest actual value is determined to be some amount somewhere in between the forecast and the control limits, a simple proportion may be used to determine the normalized quality score on this positive one to negative one scale. Of course, while the normalized quality scores in these examples are calculated on a scale of positive one to negative one, any desired scale could be used (e.g., positive ten to negative ten, positive one hundred to negative one hundred, and the like). In any case, by placing the quality scores for various metrics on a standard scale, the data quality of various metrics may be comparatively ascertained, as seen in the following examples.

For instance, if for some metric, the forecast was determined to be 5, the lower control limit was determined to be 4, and the upper control limit was determined to be 6, and if the latest actual value were determined to be 5, then the normalized quality score may be determined to be 0. If, in this example, the latest actual value was instead determined to be 4, then the normalized quality score may be determined to be −1. Alternatively, if the latest actual value in this example was instead determined to be 6, then the normalized quality score may be determined to be +1. In another variation, if the latest actual value in this example was instead determined to be 5.5, then the normalized quality score may be determined to be +0.5, which may calculated using a simple proportion and may indicate that the latest actual value was halfway between the forecast and the upper control limit. Similarly, if the latest actual value in this example was instead determined to be 4.5, then the normalized quality score may be determined to be −0.5, which again may be calculated using a simple proportion and may indicate that the latest actual value was halfway between the forecast and the lower control limit.

Having determined the normalized quality score for the metric, the organization (e.g., the financial institution) may then better understand the quality of the data underlying the metric. For example, on the positive one to negative one scale, a normalized quality score between positive one and negative one may indicate that the quality of the data underlying the metric is high, because in such a situation, the latest actual value either was predicted by the forecast or fell within the control limits (which, as discussed above, were previously selected to be particular ranges within which variance from the forecast may be deemed acceptable). On the other hand, on this scale, a normalized quality score lesser than negative one or greater than positive one may indicate that some remedial action is required. For example, such a score may be indicative of a problem with data collection (e.g., some samples were uncounted, miscounted, and the like) or forecasting (e.g., the functions defining the forecast, upper control limit, and/or lower control limit do not accurately model the trend), or it may suggest that some substantive change has occurred (e.g., something in the substance or nature of the metric itself has changed; for instance, a retailer being measured has gone out of business, a workforce reduction has occurred, and the like).

At this point, the method may end in some arrangements. In other arrangements, however, it may be desirable to perform additional steps to compare the metric to other metrics and/or to handle remediation issues if the latest actual value exceeded a control limit. These additional steps will now be described.

Figure 4:
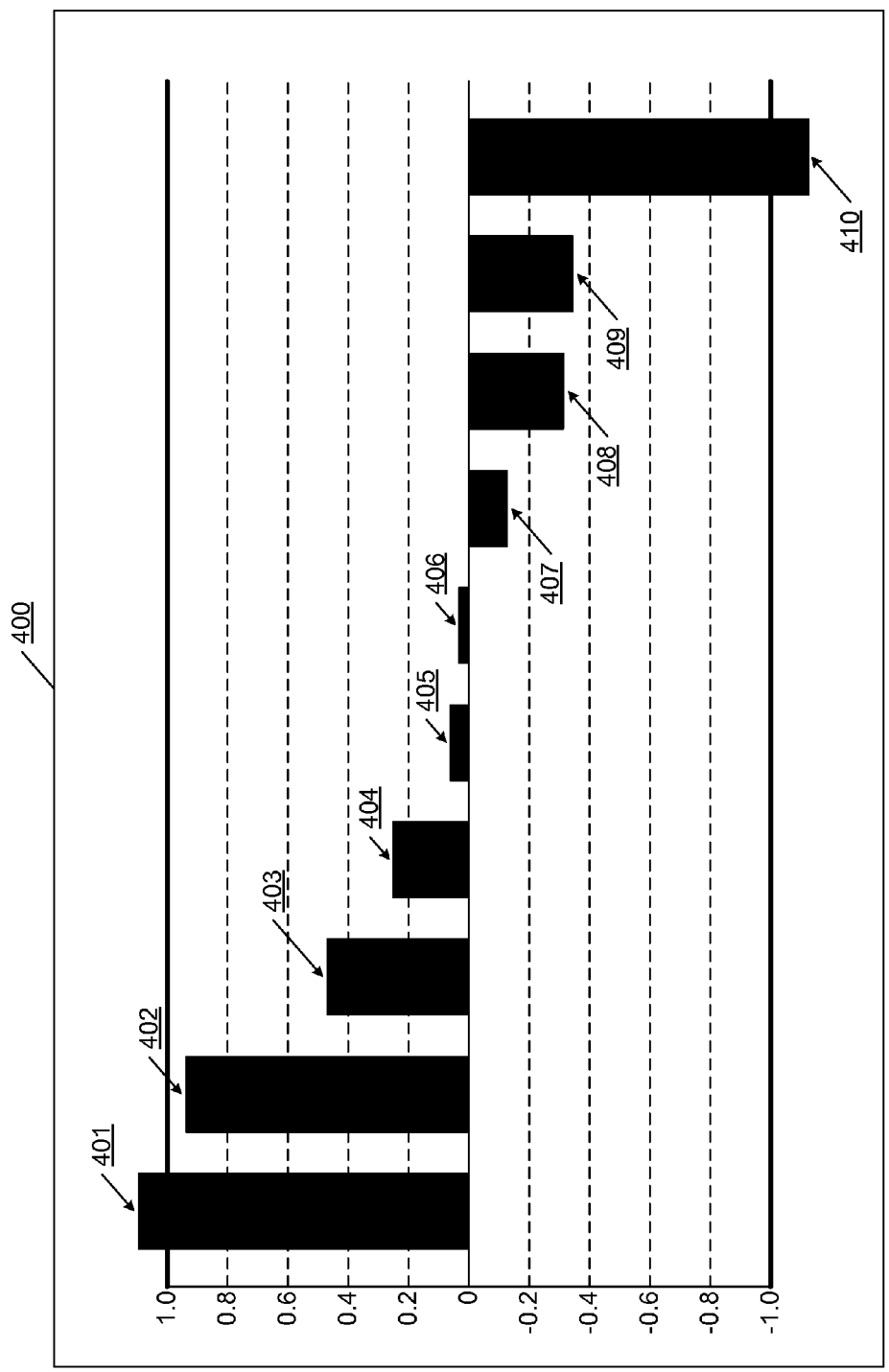
FIG. 4 illustrates a user interface for analyzing data quality for a plurality of metrics according to one or more illustrative aspects described herein.

In optional step 207, a comparison chart may be generated. In one or more arrangements, the comparison chart may include the normalized quality score for the metric and at least one other normalized quality score for at least one other metric. For example, such a comparison chart may take the form of a bar graph, and because the quality scores underlying the bars displayed in the graph may be normalized, the heights of the various bars may indicate the data quality of the various metrics in relation to each other. Using such a graph, an organization, such as a financial institution, may be able to quickly and easily identify data quality issues in particular metrics, even if tens of thousands metrics are being analyzed and evaluated. An example of such a chart is illustrated in FIG. 4, which is further described below.

Additionally or alternatively, in optional step 208, it may be determined whether the latest actual value of the metric exceeded the upper control limit or the lower control limit for the metric. As indicated above, if the latest actual value of the metric exceeded one of the control limits, it may be desirable to take some remedial action with respect to the metric.

Thus, if it is determined in optional step 208 that the latest actual value of the metric did not exceed the upper control limit or the lower control limit for the metric, then the method may end. Alternatively, if it is determined in optional step 208 that the latest actual value of the metric did exceed the upper control limit or the lower control limit for the metric, then in optional step 209, the metric may be added to an issue log. Subsequently, the method may end.

In one or more arrangements, such an issue log may include a listing of various metrics, as well as detailed information about each metric to assist an analyst in assessing what remedial actions may be necessary to improve the data quality of the particular metric. For example, in addition to identifying each metric by name and/or some other identifier, the issue log also may include, for each metric, historical performance information (e.g., past actual values for the metric, past forecasted values for the metric, and the like), one or more charts and graphs, information about the forecasting functions used for the particular metric, and/or other information. Using this information, an organization, such as a financial institution, may be able to identify ways to improve the data quality of a particular metric, such as by modifying the functions used to calculate the forecast and control limits for the metric, by changing the data sources and/or sample sizes used in calculating the metric, and/or by taking other actions.

As discussed above, the methods described herein may be particularly useful to an organization, such as a financial institution, in comparatively evaluating the quality of data underlying various metrics. Thus, a method of assessing data quality for a plurality of metrics will now be described.

Figure 3:
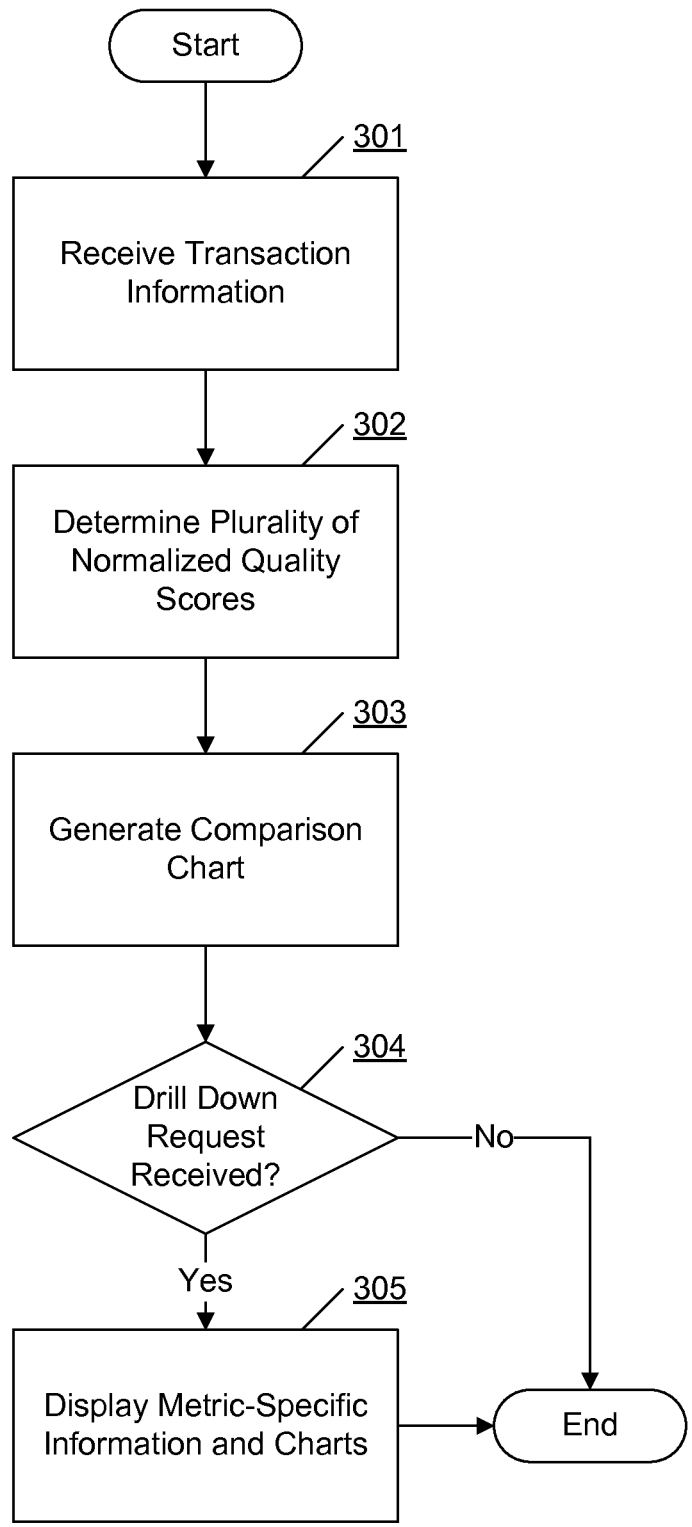
FIG. 3 illustrates a method of analyzing data quality for a plurality of metrics according to one or more illustrative aspects described herein.

FIG. 3 illustrates an example method of analyzing data quality for a plurality of metrics according to one or more aspects described herein. In step 301, transaction information may be received. For example, a computing device associated with a financial institution may receive transaction information from a database similar to how transaction information was received in step 201, which was described above. As above, the transaction information may include a variety of information about various transactions that involved and/or were facilitated by the financial institution.

In step 302, a plurality of normalized quality scores may be determined for a plurality of metrics. For example, a financial institution may wish to comparatively evaluate a plurality of metrics measured by the financial institution. Thus, in step 302, one or more steps of the example method illustrated in FIG. 2 may be performed with respect to each of the plurality of metrics to be evaluated, such that a forecast, upper control limit, lower control limit, latest actual value, and normalized quality score may be determined for each of the plurality of metrics.

Subsequently, in step 303, a comparison chart may be generated, and the comparison chart may illustrate the normalized quality scores for each metric of the plurality of metrics. For example, in this step, the computing device may generate a comparison chart in the form of a bar graph, as similar to how such a chart was generated in step 207, which was described above. Here, as above, this chart may enable the financial institution to quickly and easily identify data quality issues in particular metrics, even where large numbers of metrics are being analyzed and evaluated.

In step 304, it may be determined whether a drill down request was received. Such a drill down request may be received as user input, and the request may represent a command by the user to display more information about one or more particular metrics included in the comparison chart. In at least one arrangement, the drill down request may be received as user input in response to a user of the computing device clicking on a bar included in the comparison chart generated in step 303.

If it is determined in step 304 that no drill down request was received, then the method may end. Alternatively, if it is determined in step 304 that a drill down request was received, then in step 305, additional information and/or one or more additional charts specific to the selected metric or metrics may be displayed. For example, in response to the drill down request, a chart illustrating past performance of the metric, such as the example chart illustrated in FIG. 5, may be displayed. Additionally or alternatively, one or more data tables may be displayed, such as the example data tables illustrated in FIGS. 6-11, and the user may be able to modify the information included in these data tables, which may result, for instance, in changing the functions used in forecasting, calculating control limits, determining the latest actual value of the metric, and/or the like. Subsequently, the method may end.

Having discussed various methods via which an organization, such as a financial institution, may comparatively evaluate the quality of data underlying various metrics, some example user interfaces and data tables that may be used in implementing various aspects of the disclose will now be described.

FIG. 4 illustrates an example user interface for analyzing data quality for a plurality of metrics according to one or more aspects described herein. According to one or more aspects, any and/or all of the user interfaces described herein may be implemented by software executed on one or more computers, such as generic computing device 101, and/or in a network environment, such as network environment 200.

As seen in FIG. 4, user interface 400 may include a graph with a plurality of bars, such as bars 401-410. According to one or more aspects, each bar in the graph may represent the normalized quality score for a particular metric analyzed using one or more of the methods described herein. In one or more arrangements, the graph itself may be on the same scale to which the quality scores are normalized (which, in this example, is on a scale of positive one to negative one), and may include thicker bars at each of the control limits on the scale (which, in this example, are at positive one and negative one). In addition, the bars may be arranged from high to low (or low to high) so as to more clearly indicate which metric or metrics (if any) have exceeded their control limits. Each bar also may include a label to identify which metric it corresponds to and/or to indicate what the normalized data quality score was determined to be for the metric corresponding to the particular bar.

By considering the graph illustrated in user interface 400, an analyst associated with a financial institution, for instance, may be able to quickly and easily determine which metrics require remediation for data quality issues. For example, it may be seen that bar 401 extends beyond the control limit line at +1.0, which may indicate that the metric corresponding to bar 401 has exceeded its upper control limit. Accordingly, based on the graph, it may be determined that remedial action should be taken to address and/or correct the data quality issues associated with that metric. Similarly, in this example graph, it may be seen that bar 410 extends below the control limit line at −1.0, which may indicate that the metric correspond to bar 410 has exceeded its lower control limit. Accordingly, based on the graph, it may be determined that remedial action also should be taken to address and/or correct the data quality issues associated with this metric. On the other hand, it may be seen that bars 402-409 fall within the control limit lines, which may indicate that the data quality levels for these metrics are within acceptable ranges.

Figure 5:
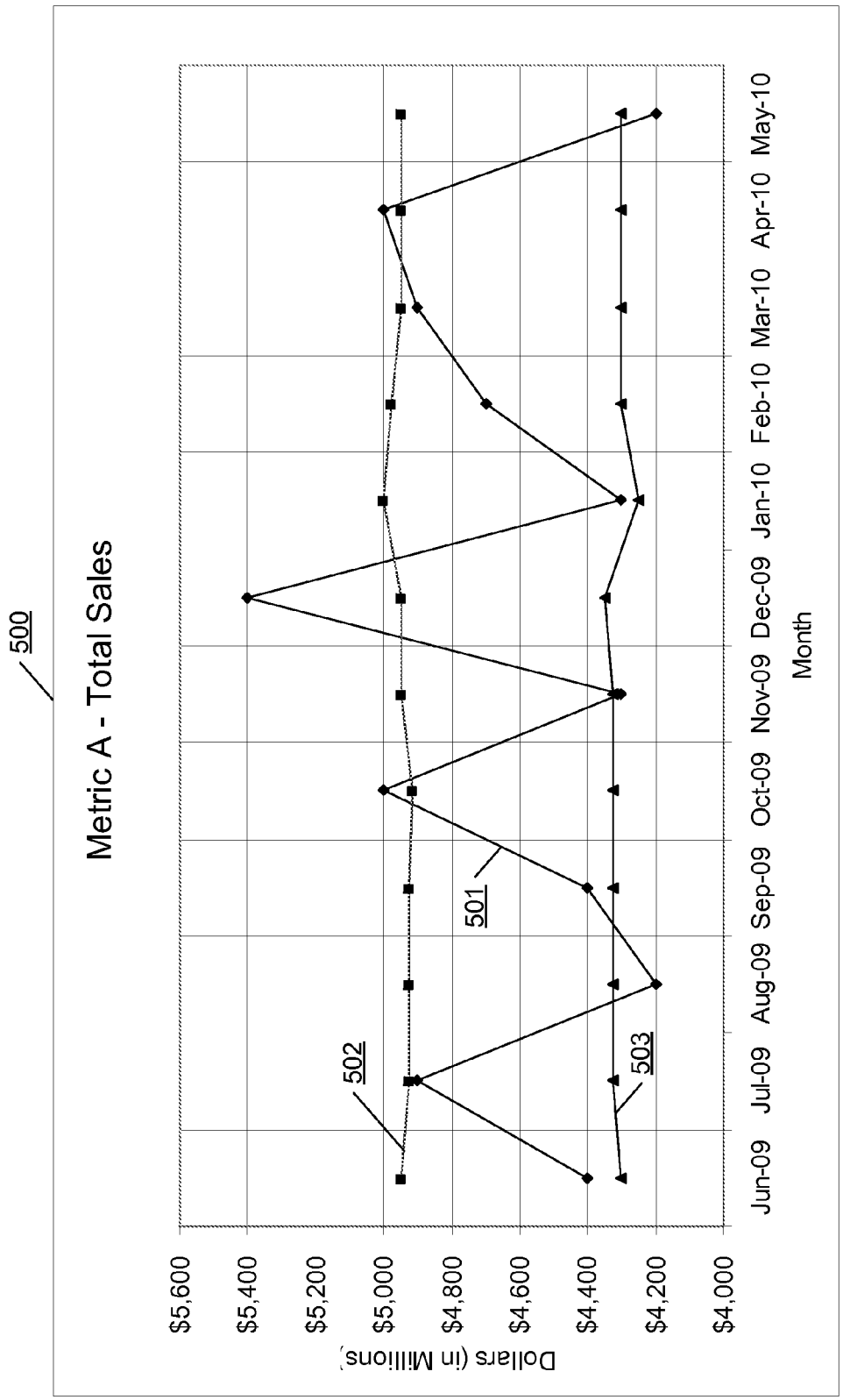
FIG. 5 illustrates a user interface for analyzing data quality for a particular metric according to one or more illustrative aspects described herein.

FIG. 5 illustrates an example user interface for analyzing data quality for a particular metric according to one or more aspects described herein. As discussed above, example user interface 500 of FIG. 5 may be displayed when a user requests to view additional information about a particular metric. Thus, user interface 500 may include a chart that includes a trend line 501, which may graphically represent previous performance data for a particular metric. In addition, user interface 500 may include additional lines 502 and 503, which may graphically represent previous values of the upper control limit of the metric and the lower control limit of the metric, respectively. By reviewing the chart illustrated in user interface 500, an analyst for a financial institution, for instance, may be able to better understand the behavior of a particular metric and its control limit functions, which may enable the analyst to select better modeling functions for the metric and improve the calculations underlying both the metric and its various data quality evaluation functions (e.g., the forecasting method for the metric, the functions used in calculating the control limits for the metric, and the like).

FIG. 6 illustrates an example metric definition table according to one or more aspects described herein. In one or more arrangements, data table 600 may include a plurality of fields defining one or more aspects of a particular metric. For example, data table 600 may include a description field 601, which may include a plain-language description of the metric, such as what the metric measures, what parameters the metric depends on, how accurate the metric has been historically, and/or other matters. In addition, data table 600 may include a latest actual value field 602 in which a calculation method for computing the latest actual value of the metric and the one or more parameters used by the calculation method may be specified. Data table 600 also may include a forecast field 603 in which a calculation method for computing the forecast for the metric and the one or more parameters used by the forecast method may be specified. Similarly, data table may further include a lower control limit field 604 and an upper control limit field 605 in which the calculation methods for computing the upper and lower control limits and their respective parameters may be specified.

FIG. 7 illustrates an example metric history table according to one or more aspects described herein. In one or more arrangements, data table 700 may include past performance data for one or more metrics, and in some instances, the information in data table 700 may be used in generating a comparison chart (e.g., as described above with respect to FIG. 4). For example, data table 700 may include, for a plurality of metrics, the most recent actual value of each metric, the most recent forecast value for each metric, the most recent lower control limit value for each metric, the most recent upper control limit value for each metric, the most recent quality score for each metric, and/or the date at which this quality score was determined.

FIG. 8 illustrates an example forecast definition table according to one or more aspects described herein. In one or more arrangements, data table 800 may include a plurality of fields defining one or more aspects of a particular forecast method. For example, data table 800 may include a description field 801, which may include a plain-language description of the forecast method, such as how the forecast method calculates a forecast, what parameters the forecast method depends on, what types of trends are best modeled using the forecast method, and/or other matters. In addition, data table 800 may include a formula field 802 in which a formula or other calculation method for computing the value of the forecast may be specified. Data table 800 also may include a parameters field 803 in which one or more parameters used by the forecast method may be specified. In some arrangements, the one or more parameters in parameters field 803 may be specified in terms of a database query or uniform resource identifier (URI) indicating how the data underlying the parameters may be accessed and/or where such data is located (e.g., on another server or in a database maintained by the financial institution). Additionally or alternatively, data table 800 may further include a source code field 804 in which the location of software source code for performing the forecast method may be specified (e.g., one or more file and/or directory names, one or more URIs, and the like).

FIG. 9 illustrates an example lower control limit definition table according to one or more aspects described herein. In one or more arrangements, data table 900 may include a plurality of fields defining one or more aspects of a particular function for calculating a lower control limit. For example, data table 900 may include a description field 901, a formula field 902, a parameters field 903, and/or a source code field 904. Fields 901-904 of data table 900 may be similar to their counterparts in data table 800 of FIG. 8, except that the information in fields 901-904 may describe aspects of a function for calculating a lower control limit (rather than a forecast method as in FIG. 8).

FIG. 10 illustrates an example upper control limit definition table according to one or more aspects described herein. In one or more arrangements, data table 1000 may include a plurality of fields defining one or more aspects of a particular function for calculating an upper control limit. For example, data table 1000 may include a description field 1001, a formula field 1002, a parameters field 1003, and/or a source code field 1004. Fields 1001-1004 of data table 1000 may be similar to their counterparts in data table 900 of FIG. 9, except that the information in fields 1001-1004 may describe aspects of a function for calculating an upper control limit (rather than a lower control limit as in FIG. 9).

FIG. 11 illustrates an example latest actual value definition table according to one or more aspects described herein. In one or more arrangements, data table 1100 may include a plurality of fields defining one or more aspects of a particular function for or method of calculating the latest actual value of a particular metric. For example, data table 1100 may include a description field 1101, a formula field 1102, a parameters field 1103, and/or a source code field 1104. Fields 1101-1104 of data table may be similar to their counterparts in data table 800 of FIG. 8, except that the information in fields 1101-1104 may describe aspects of a function for or method of calculating the latest actual value of a metric (rather than a forecast method as in FIG. 8).

II. Additional Illustrative Embodiments

As described above, various aspects of the disclosure may be used in evaluating data quality. In addition, the concepts described herein may be useful in a variety of contexts and/or scenarios. For example, different types of metrics may be analyzed in accordance with one or more aspects of the disclosure.

For instance, in one example scenario, an organization may use a metric to measure the percentage of rows in a table that have no value in a particular field (e.g., a tax identification number field). If this percentage is determined to be less than five percent, the metric may be determined to be "green"; if the percentage is determined to be greater than or equal to five percent and less than ten percent, the metric may be determined to be "yellow"; and/or if the percentage is determined to be greater than or equal to ten percent, the metric may be determined to be "red." In at least one arrangement, this type of metric may be analyzed in accordance with one or more aspects of the disclosure described above.

In another example scenario, an organization may use a metric to measure the percentage of rows in a table that have a correctly formatted value (e.g., a correctly formatted date in a birthday field). If this percentage is determined to be greater than ninety-five percent, the metric may be determined to be "green"; if the percentage is determined to be less than or equal to ninety-five percent and greater than ninety percent, the metric may be determined to be "yellow"; and/or if the percentage is determined to be less than or equal to ninety percent, the metric may be determined to be "red." In at least one arrangement, this type of metric may be analyzed in accordance with one or more aspects of the disclosure described above.

In still another example scenario, an organization may use a metric to measure how much money was spent using credit cards each month at a particular store. Subsequently, the organization may predict an expected spending amount for the coming month by calculating the average monthly spending over the previous year, and may consider the prediction to be any value within one standard deviation from the monthly average (e.g., the prediction for the coming month may be equal to the monthly average for the past year, plus or minus one standard deviation). In at least one arrangement, this type of metric may be analyzed in accordance with one or more aspects of the disclosure described above.

In another example scenario, an organization may use a metric to measure sales at a particular store, but the particular store may have merged recently with another store for which historical data is unavailable. To predict the amount of sales for the newly combined stores for the coming month, the metric may need to be adjusted. In at least one arrangement, this type of metric may be analyzed in accordance with one or more aspects of the disclosure described above.

In another example scenario, an organization may use a metric to measure the ratio of total spending at grocery stores to total spending at gas stations for the previous month. In addition, the organization may predict the value of the ratio for the coming month using a function that accounts for both the overall trend of the data and the volatility of the data over the past nine months. In at least one arrangement, this type of metric may be analyzed in accordance with one or more aspects of the disclosure described above.

Thus, in view of these example scenarios, it may be seen that there may be many different things that an organization, such as a financial institution, may choose to measure (e.g., depending on one or more particular topics of interest). In addition, it may be seen that there may be many different ways that such an organization may forecast what the next actual value of any given metric may be. Furthermore, it may be seen that there may be many different ways that such an organization may evaluate whether a result should be considered "good" or "bad."

By implementing one or more aspects of the disclosure, an organization, such as a financial institution, may account for the complexity, variety, and/or quantity of its metrics to comparatively evaluate data quality with respect to any and/or all of such metrics. Additionally or alternatively, by implementing one or more aspects of the disclosure, such an organization may be able to organize metrics, monitor metrics, and/or identify which metrics require additional (and potentially immediate) attention. Moreover, such an organization may do so even when, for example, the one or more metrics are dissimilar from one another to the extent that they might not be measured on the same scale.

Thus, by implementing one or more aspects of the disclosure, an organization, such as a financial institution, may be able to rapidly add hundreds or thousands of metrics (or more) to a collection of metrics being monitored by the organization. In addition, by implementing one or more aspects of the disclosure, such an organization may be able to apply different methods in calculating forecasts with respect to each of the one or more metrics, as appropriate. Furthermore, by implementing one or more aspects of the disclosure, such an organization may be able to apply different methods in calculating control limits around each forecast for each of the one or more metrics, as appropriate.

Additionally or alternatively, by implementing one or more aspects of the disclosure, such an organization may be able to normalize a qualitative assessment of each of the plurality of metrics (e.g., normalize its determinations of whether particular metrics are "good" or "bad"), which in turn may allow for the creation of visualizations or charts that may quickly reveal which metrics of the plurality of metrics require further attention (e.g., immediate attention), even where the one or more metrics are so dissimilar from one another that they might not be measured on the same scale.

While one or more of the examples described herein discuss information in the form of a series of values received and/or computed over time, one or more analytical approaches similar to those described herein may be applied to single point estimates and/or result sets comprising n-dimensional matrices (e.g., where "n" represents an infinite and/or undefined number) in accordance with one or more aspects of the disclosure. Furthermore, while financial data and/or transactional data is used in various illustrations herein, one or more aspects of the disclosure may be similarly applied in analyzing one or more collections of data of any desired kind or kinds, regardless of topic of interest and/or industry.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the following claims will occur to persons of ordinary skill in the art from a review of this disclosure. For example, the steps illustrated in the illustrative figures may be performed in other than the recited order, and one or more steps illustrated may be optional in accordance with aspects of the disclosure.

What is claimed is:

1. A method, comprising:
    receiving transaction information from a database;
    calculating a forecast based on the transaction information, the forecast predicting the future value of a metric;
    calculating an upper control limit for the metric based on the transaction information;
    calculating a lower control limit for the metric based on the transaction information;
    computing the latest actual value of the metric; and
    calculating a normalized quality score for the metric based on the latest actual value of the metric, the forecast, the upper control limit, and the lower control limit,
    wherein calculating the normalized quality score for the metric includes:
        determining a first difference by calculating a difference between the latest actual value of the metric and the forecast;
        if the latest actual value of the metric is closer to the upper control limit than the lower control limit, determining a second difference by calculating a difference between the forecast and the upper control limit;
        if the latest actual value of the metric is not closer to the upper control limit than the lower control limit, determining the second difference by calculating a difference between the forecast and the lower control limit; and
        dividing the first difference by the second difference to obtain the normalized quality score.

2. The method of claim 1, wherein the normalized quality score is calculated on a scale from negative one to positive one.

3. The method of claim 1, wherein the forecast is calculated using a first modeling function.

4. The method of claim 3,
    wherein the upper control limit is calculated using a second modeling function different from the first modeling function, and
    wherein the lower control limit is calculated using a third modeling function different from the first modeling function and the second modeling function.

5. The method of claim 1, further comprising:
    generating a chart that includes the normalized quality score for the metric and at least one other normalized quality score for at least one other metric.

6. The method of claim 1, further comprising:
    in response to determining that the latest actual value of the metric has exceeded one of the upper control limit and the lower control limit, adding the metric to an issue log for remediation.

7. One or more non-transitory computer-readable media having computer-executable instructions stored thereon that, when executed, cause at least one processor to:
    receive transaction information from a database;

calculate a forecast based on the transaction information, the forecast predicting the future value of a metric;
calculate an upper control limit for the metric based on the transaction information;
calculate a lower control limit for the metric based on the transaction information;
compute the latest actual value of the metric; and
calculate a normalized quality score for the metric based on the latest actual value of the metric, the forecast, the upper control limit, and the lower control limit,
wherein calculating the normalized quality score for the metric includes:
determining a first difference by calculating a difference between the latest actual value of the metric and the forecast;
if the latest actual value of the metric is closer to the upper control limit than the lower control limit, determining a second difference by calculating a difference between the forecast and the upper control limit;
if the latest actual value of the metric is not closer to the upper control limit than the lower control limit, determining the second difference by calculating a difference between the forecast and the lower control limit; and
dividing the first difference by the second difference to obtain the normalized quality score.

8. The one or more non-transitory computer-readable media of claim 7, wherein the normalized quality score is calculated on a scale from negative one to positive one.

9. The one or more non-transitory computer-readable media of claim 7, wherein the forecast is calculated using a first modeling function.

10. The one or more non-transitory computer-readable media of claim 9,
wherein the upper control limit is calculated using a second modeling function different from the first modeling function, and
wherein the lower control limit is calculated using a third modeling function different from the first modeling function and the second modeling function.

11. The one or more non-transitory computer-readable media of claim 7, having additional computer-executable instructions stored thereon that, when executed, further cause at least one processor to:
generate a chart that includes the normalized quality score for the metric and at least one other normalized quality score for at least one other metric.

12. The one or more non-transitory computer-readable media of claim 7, having additional computer-executable instructions stored thereon that, when executed, further cause at least one processor to:
in response to determining that the latest actual value of the metric has exceeded one of the upper control limit and the lower control limit, add the metric to an issue log for remediation.

13. An apparatus, comprising:
at least one processor; and
memory storing computer-readable instructions that, when executed by the at least one processor, cause the apparatus to:
receive transaction information from a database;
calculate a forecast based on the transaction information, the forecast predicting the future value of a metric;
calculate an upper control limit for the metric based on the transaction information;
calculate a lower control limit for the metric based on the transaction information;
compute the latest actual value of the metric; and
calculate a normalized quality score for the metric based on the latest actual value of the metric, the forecast, the upper control limit, and the lower control limit,
wherein calculating the normalized quality score for the metric includes:
determining a first difference by calculating a difference between the latest actual value of the metric and the forecast;
if the latest actual value of the metric is closer to the upper control limit than the lower control limit, determining a second difference by calculating a difference between the forecast and the upper control limit;
if the latest actual value of the metric is not closer to the upper control limit than the lower control limit, determining the second difference by calculating a difference between the forecast and the lower control limit; and
dividing the first difference by the second difference to obtain the normalized quality score.

14. The apparatus of claim 13, wherein the normalized quality score is calculated on a scale from negative one to positive one.

15. The apparatus of claim 13, wherein the forecast is calculated using a first modeling function.

16. The apparatus of claim 15,
wherein the upper control limit is calculated using a second modeling function different from the first modeling function, and
wherein the lower control limit is calculated using a third modeling function different from the first modeling function and the second modeling function.

17. The apparatus of claim 13, the memory storing additional computer-readable instructions that, when executed by the at least one processor, further cause the apparatus to:
generate a chart that includes the normalized quality score for the metric and at least one other normalized quality score for at least one other metric.

18. The apparatus of claim 13, the memory storing additional computer-readable instructions that, when executed by the at least one processor, further cause the apparatus to:
in response to determining that the latest actual value of the metric has exceeded one of the upper control limit and the lower control limit, add the metric to an issue log for remediation.

* * * * *